(12) United States Patent
Antonatos et al.

(10) Patent No.: US 11,132,386 B2
(45) Date of Patent: Sep. 28, 2021

(54) FAST LINKING OF ANONYMIZED DATASETS

(71) Applicant: INTERNATIONAL BUSINESS MACHINES CORPORATION, Armonk, NY (US)

(72) Inventors: Spyridon Antonatos, Dublin (IE); Stefano Braghin, Dublin (IE); Naoise Holohan, Dublin (IE); Pol MacAonghusa, Carbury (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 282 days.

(21) Appl. No.: 16/276,703

(22) Filed: Feb. 15, 2019

(65) Prior Publication Data

US 2020/0265069 A1 Aug. 20, 2020

(51) Int. Cl.
*G06F 16/28* (2019.01)
*G06N 5/02* (2006.01)
*G06F 16/2457* (2019.01)

(52) U.S. Cl.
CPC ...... *G06F 16/285* (2019.01); *G06F 16/24578* (2019.01); *G06N 5/022* (2013.01)

(58) Field of Classification Search
CPC .......... G06F 21/6227; G06F 16/24578; G06F 21/6254; G06F 16/285; G06F 16/21; G06N 5/022
See application file for complete search history.

(56) References Cited

U.S. PATENT DOCUMENTS

| | | | |
|---|---|---|---|
| 10,037,437 B1 | 7/2018 | Kenthapadi et al. | |
| 2003/0233357 A1* | 12/2003 | Merenda | G06F 16/958 |
| 2011/0145301 A1* | 6/2011 | Fabret | G06F 16/256 |
| | | | 707/803 |
| 2014/0050384 A1* | 2/2014 | Schmidt | G06T 7/0012 |
| | | | 382/131 |
| 2015/0112877 A1* | 4/2015 | Schilder | G06Q 50/00 |
| | | | 705/311 |
| 2018/0218174 A1 | 8/2018 | Cuthbertson | |
| 2020/0250332 A1* | 8/2020 | Hasegawa | G06F 21/6227 |

FOREIGN PATENT DOCUMENTS

WO 2017072623 A1 5/2017

\* cited by examiner

*Primary Examiner* — Etienne P Leroux
(74) *Attorney, Agent, or Firm* — Griffiths & Seaton PLLC

(57) ABSTRACT

Various embodiments are provided for linking of anonymized datasets in a computing environment are provided. A number of linking records may be identified between an anonymized dataset and one or more non-anonymized datasets of a knowledge base according to one or more equivalence classes and a generalization level.

17 Claims, 10 Drawing Sheets

FAST LINKING OF ANONYMIZED DATASETS

BACKGROUND OF THE INVENTION

Field of the Invention

The present invention relates in general to computing systems, and more particularly to, various embodiments for fast linking records between anonymized datasets and non-anonymized datasets using a computing processor.

Description of the Related Art

In today's interconnected and complex society, computers and computer-driven equipment are more commonplace. Processing devices, with the advent and further miniaturization of integrated circuits, have made it possible to be integrated into a wide variety of devices. The advent of computers and networking technologies have made possible the intercommunication of people from one side of the world to the other. However, ensuring data integrity from various types of computing attacks are a continuous challenge to address.

SUMMARY OF THE INVENTION

Various embodiments for linking records between anonymized datasets and non-anonymized datasets in a computing environment are provided. In one embodiment, by way of example only, a method for fast linking records between anonymized datasets and non-anonymized datasets, by a processor, is provided. A number of linking records may be identified between an anonymized dataset and one or more non-anonymized datasets of a knowledge base according to one or more equivalence classes and a generalization level.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
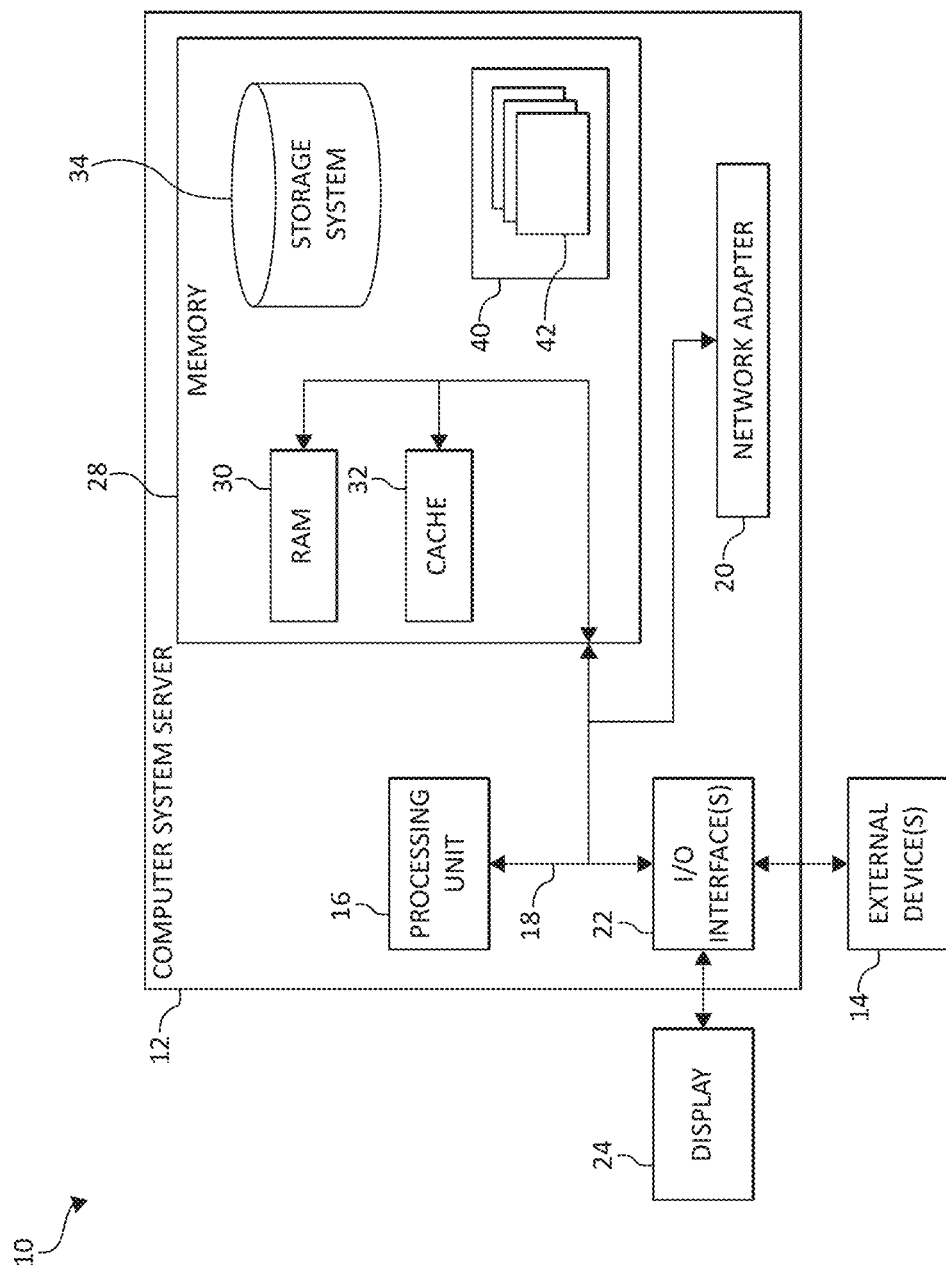
FIG. 1 is a block diagram depicting an exemplary cloud computing node according to an embodiment of the present invention.

In recent years, people have been witnessing a data explosion with data being estimated in the order of zettabytes. Analysing this wealth and volume of data offers remarkable opportunities for growth in various industries and sectors (of types of entities (e.g., companies, governments, academic institutions, organizations, etc.). However, the majority of these datasets (e.g., healthcare data, telecommunication data, banking data, etc.) are proprietary and many contain personal and/or business sensitive information. Examples of sensitive data include patient records, special housing information, tax records, customer purchase records, academic records, mobile call detail records (CDR), etc.

In some situations, these various organizations desire to share the datasets with third parties. Due to worldwide privacy regulations governing different types of person-specific data, such as patient data in electronic health records, user data may be required to be anonymized before being shared with third parties. That is, the privacy of individuals is protected by employing anonymization techniques on the original datasets (e.g., masking, k-anonymity, differential privacy, etc.). In some cases, data that may be anonymized data may be needed to share with third parties.

Currently, however, anonymized datasets contain generalized forms of values that cannot directly participate in a join operation. Anonymized datasets may need to be evaluated in terms of reidentification of risk by linking against public or private datasets. For example, it may be desired to evaluate the risk of an anonymized dataset against census data. A traditional join operation links a dataset between non-anonymized datasets. For example, dates can be generalized by removing precision (e.g., eliminating the days and month) or other values such as, for example, the age can be set in 5 years intervals. Dataset linking between anonymized datasets and non-anonymized datasets (e.g., a target population datasets) is an expensive process. Hierarchical and range queries can be used to do this kind of linking.

However, hierarchical/range queries are not supported by all database systems and may be prohibitively slower in certain database system. For example, current systems may attempt to execute a long series of joins by re-ordering the data order in which the join operations are executed to reduce data access/transfer. Also, an execution of the join itself is performed by leveraging the distributions of data in order to understand how to better partition the data and/or in which order to execute filtering operations to obtain a more parallelizable dataset. However, due to these computing inefficiencies the present invention redefines the definition of a join operation by linking both anonymized datasets with non-anonymized datasets that applies for various types of anonymization operations. In this way, the present invention provides a solution to increase and speed up the count of matching records between two (or more) datasets where one of the datasets is anonymized (i.e., the records have been generalized). To achieve this, the present invention may infer a transformation that has been applied to the anonymized dataset and transforms the non-anonymized datasets.

Thus, the present invention transforms the traditional join operation by providing an enhanced join operation to be executed by fast linking records between anonymized datasets and non-anonymized datasets, by a processor, is provided. A number of linking records may be identified between an anonymized dataset and one or more non-anonymized datasets of a knowledge base according to one or more equivalence classes and a generalization level.

In one aspect, the present invention provides an efficient and scalable solution for dataset linking that is required for re-identification risk calculation. The present invention provides a solution, for example, when datasets that scale to billions of records, which prevent precomputing all possible join combination, provides a uniform way to handle different variations of anonymization approaches, namely both global and local recoding approaches. The present invention may be applied to all (preferably distributed) database systems and (preferably distributed) querying systems.

In an additional aspect, the present invention provides for determining/computing the number of linking records of an anonymized dataset against a target non-anonymized knowledge base. The present invention may provide an equivalence classes extractor operation to extract one or more equivalence classes. A generalization level operation may be executed to identify and/or extract a generalization level. The generalization level operation may apply a generalization level to the knowledge base. A linking operation may link an equivalence class with individual datasets within the generalized knowledge base. Data of the equivalence classes of the anonymized dataset may be linked to data in the knowledge base according to the generalization level applied to the knowledge base. The target knowledge base may include, but not limited to, public and/or private datasets related to a target population such as, for example, census data, voter lists, client lists etc. One or more risks may be linked between the data of the one or more equivalence classes of the anonymized dataset and the data in the knowledge base according to the generalization level.

It should be noted that an equivalence class is a set of records having the same value for a given set of attributes, which does not have to be all the attributes of the record. Equivalence classes can be defined also as a cluster where a distance metric is defined as equality on the set of attributes. In this context, the attributes of the record may be used that are common between the records of the anonymized dataset and the knowledge base that such dataset is linked to. An equivalence classes operation may perform a clustering operation with a distance metric set to equality. That is, a distance metric set to equality means that the equivalence classes (e.g., the clusters) can be identified in the dataset by grouping records having equal value on a given set of attributes. In other words, when comparing two records this metric returns minimum distance if the records have the same values, on a given set of attributes, otherwise a maximum distance is returned.

The generalization level operation may identify generalization levels and leverages external information including, but not limited to, data hierarchies, bucketing strategies, and generalization strategies. The generalization level operation may use/leverage the external information to generalize the knowledge base according to a generalization level. Also, the linking operation may perform a join operation between the generalized knowledge base and a set of representatives of the equivalence classes having the same generalization level as the one currently applied to the knowledge base. The linking operation may also link a risk that may be reported as aggregated value of the results of the join operations applied to all the generalization levels of discovered in the anonymized dataset. For example, once the system counts the number of linked records per equivalence class, it can then return an aggregated value for the entire dataset such as, for example, the minimum number of linked records across equivalence classes or the maximum number of linking records, or the average number.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
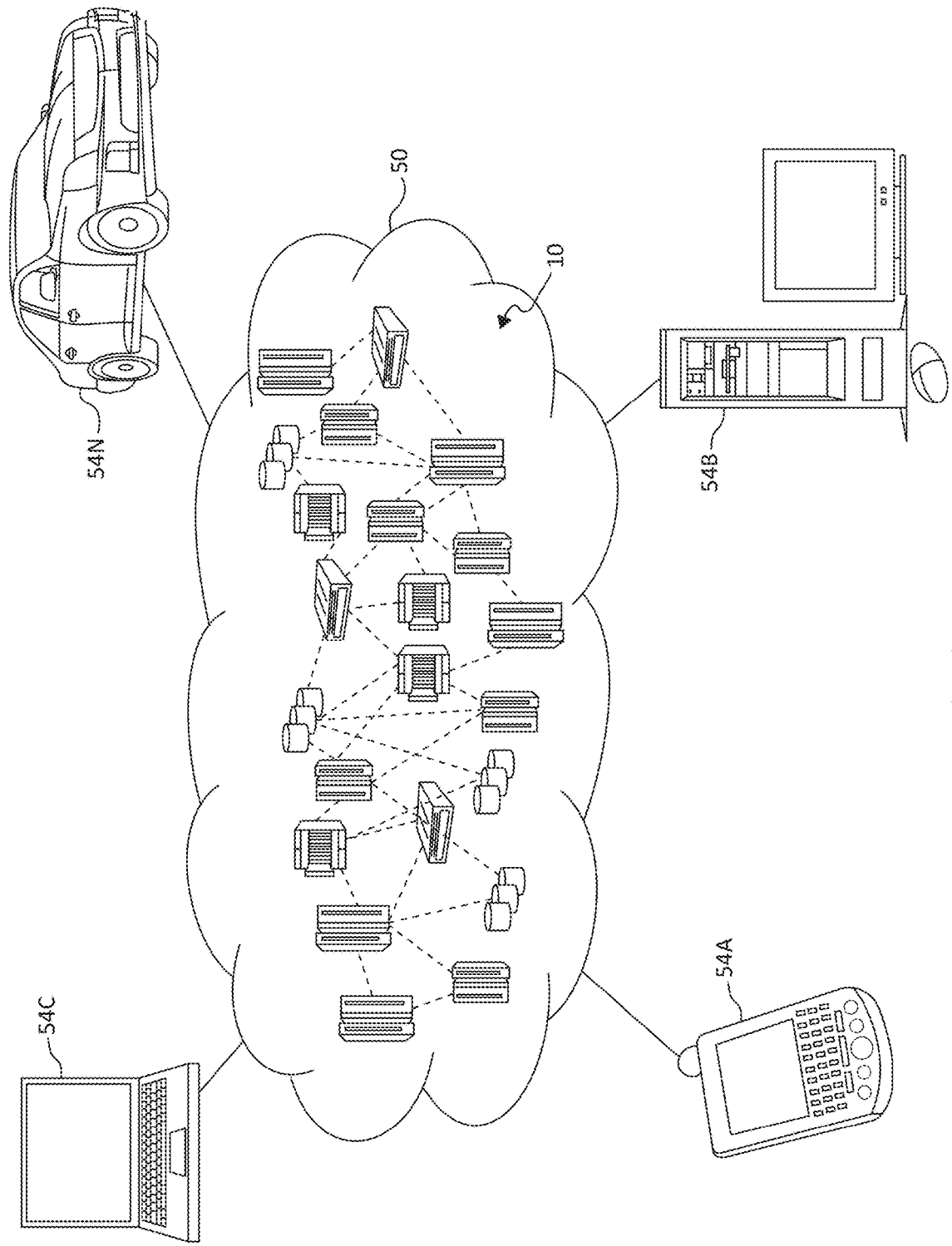
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
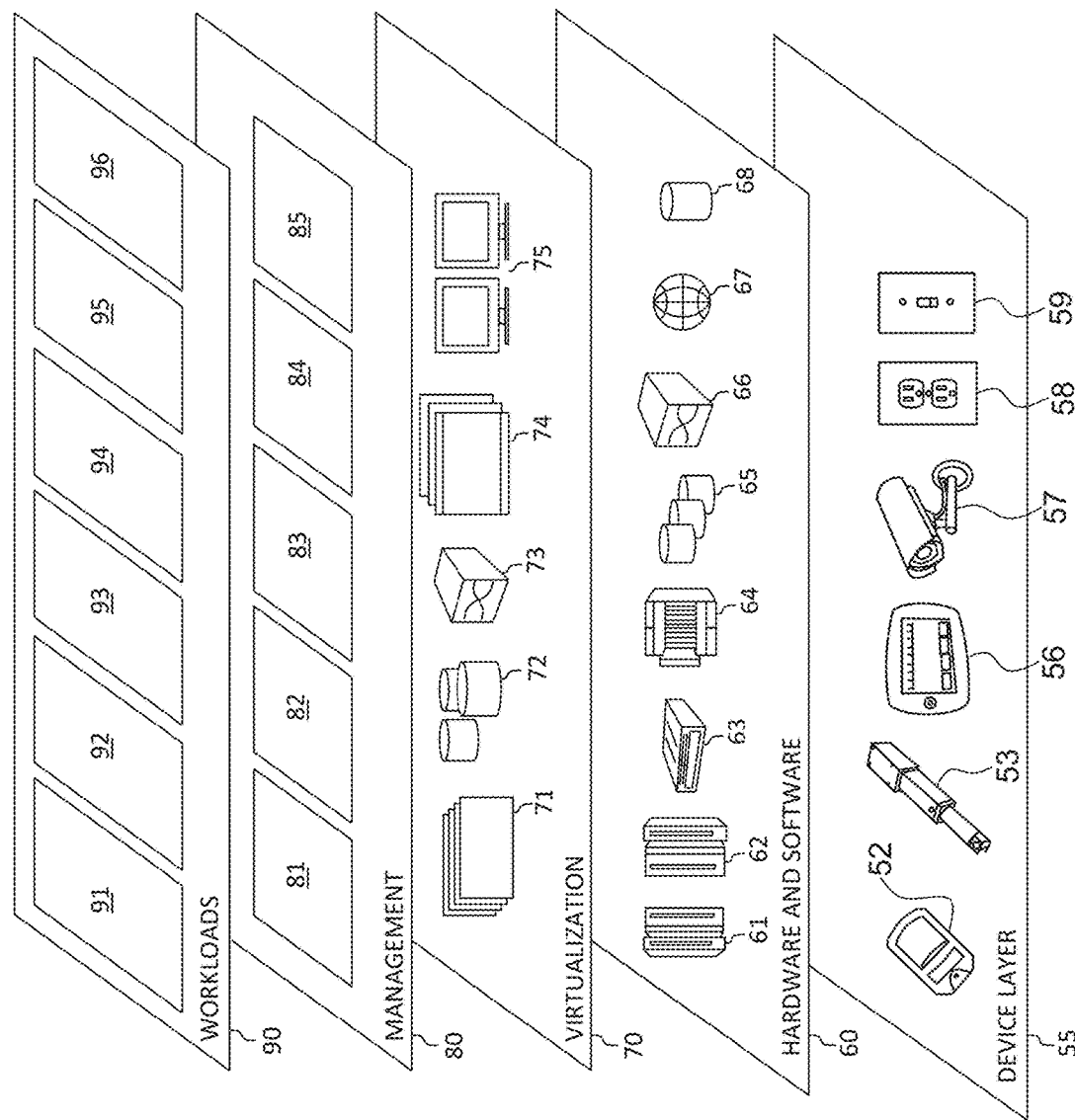
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 include hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various fast linking of records between anonymized datasets and non-anonymized workloads and functions 96. In addition, fast linking of records between anonymized datasets and non-anonymized workloads and functions 96 may include such operations as data analysis (including data collection and processing from various environmental sensors) and predictive data analytics functions. One of ordinary skill in the art will appreciate that the fast linking of records between anonymized datasets and non-anonymized workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for fast linking of records between anonymized datasets and non-anonymized. A number of linking records may be identified between an anonymized dataset and one or more non-anonymized datasets of a knowledge base according to one or more equivalence classes and a generalization level.

For example, the present invention may use as input 1) an anonymized dataset D with attributes $D_1, D_2, \ldots, D_N$, 2) a set of attributes $A_1, A_2, \ldots, A_K$ of D that have been generalized and generalization hierarchies $H_1, H_2, \ldots, H_K$ that may be used for the generalization, 3) a target population dataset P with attributes $P_1, P_2, \ldots, P_M$, and/or 4) a pair of attributes that may link to the following attributes: $\{(A_i, P_i), (A_p, P_q), \ldots, (A_i, P_y)\}$.

The output may be a number of linking records for each row of dataset D (e.g., linking$_{records}$=empty array).

In a first step, the equivalence classes of D may be formed based on the generalized attributes $A_1, A_2, \ldots, A_K$.

In a second step, for each equivalence class E, the levels of the generalized attributes $A_1, A_2, \ldots, A_K$ may be calculated and 1) the first row of the equivalence classes may be selected. The generalization level $L_i$ of the value $V_i$ of the generalized attribute $A_i$ may be the height of the value in the respective hierarchy $H_i$. The combination C of generalization levels LC=$\{L_1, L_2, \ldots, L_K\}$ may be emitted. That is, each equivalence class, defined as the set of records having the equivalent value on the attribute $A_1, A_2, \ldots, A_K$, is associated to an ordered set of generalization levels LC, which contains the generalization level $L_i$ for each attribute $A_i$. C is the set of all the ordered sets of generalization levels for all equivalence classes of the anonymized dataset.

For each unique combination C of generalization levels of step 2, a target population dataset P, based on combination C for example, may be generalized and the result may be P'. A dataset S may be formed that includes only the equivalence classes of D that have been generalized based on the combination C. A join operation may be performed on the linking attributes between dataset S and the generalized data such as, for example, population dataset P'. The number of linking records for each row of dataset S may be calculated based on the results of the join operation. The results may be appended to a linking$_{records}$ array. That is, for each set of generalization levels, the knowledge base may be anonymized, the join operation may be performed on the attributes, and a counting operation may be performed to count how many matching records there are for each record in the knowledge base. The values of all these join and count operations (e.g., join+count operations) may be added to a list (e.g., linking$_{records}$ array).

It should be noted that the present invention may be implemented as a service on one or more various types of cluster-computing frameworks, user-defined functions ("UDF) for other database systems. Thus, the present invention, in association with an underlying computing system, provides for highly distributed computation platforms, functions to map, along with partitioning and grouping data based on keys and supporting join operations on a limited set of join expression. Support may also be provided for hierarchical queries.

Figure 4:
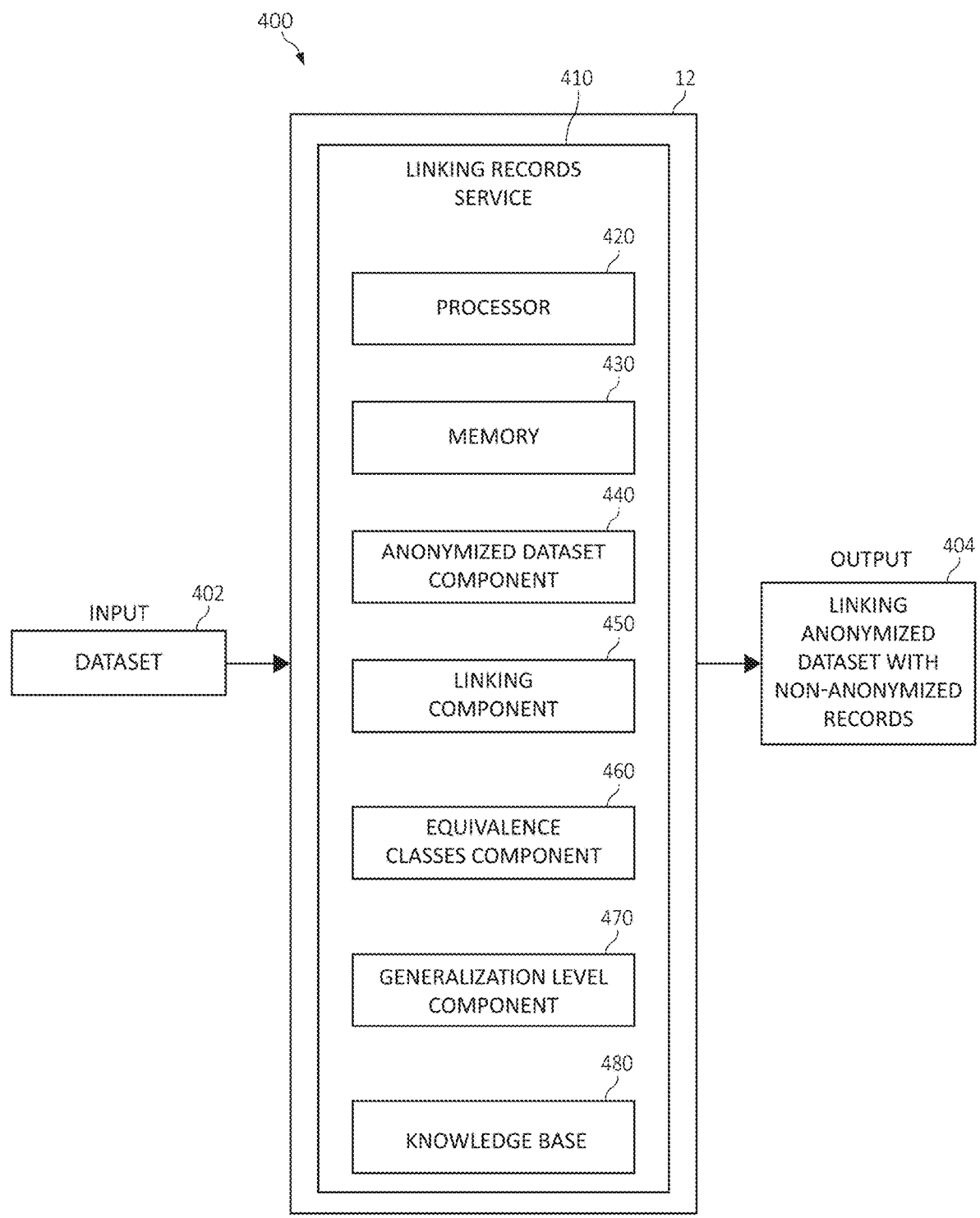
FIG. 4 is an additional block diagram depicting various user hardware and cloud computing components functioning in accordance with aspects of the present invention.

Turning now to FIG. 4, a block diagram depicting exemplary functional components 400 according to various mechanisms of the illustrated embodiments is shown for linking records between anonymized datasets and non-anonymized. In one aspect, one or more of the components, modules, services, applications, and/or functions described in FIGS. 1-3 may be used in FIG. 4.

A linking records service 410 is shown, incorporating processing unit 420 to perform various computational, data processing and other functionality in accordance with various aspects of the present invention. The linking records service 410 may be included in computer system/server 12, as described in FIG. 1. The processing unit 420 ("processor") may be in communication with memory 430.

The linking records service 410 may also include an anonymized dataset component 440, a linking component 450, an equivalence classes component 460, a generalization level component 470, and a knowledge base 480, each of which may be in communication with each other. In one aspect, the knowledge base 480 may be internal to the linking records service 410 or may be external to the linking records service 410. For example, the knowledge base 480 may be a third-party database in communication with the linking records service 410.

As one of ordinary skill in the art will appreciate, the depiction of the various functional units in linking records service 410 is for purposes of illustration, as the functional units may be located within the linking records service 410 or elsewhere within and/or between distributed computing components.

Responsive to receiving dataset 402 from an enterprise, such as a healthcare company, the anonymized dataset component 440 may perform a data anonymization operation (e.g., data masking, k-anonymity, differential privacy, etc.) on the dataset 402. For example, the anonymized dataset component 440 may transform the dataset 402 into an anonymized dataset. The anonymized dataset component 440 may also define a risk threshold. The anonymized dataset component 440 may then ensure that the anonymized records have an equal to or higher risk to be re-identified than the risk threshold. The anonymized dataset component 440 may also ensure that the anonymized records are unique for each recipient third party. The risk representing an amount of risk (e.g., a value, range of values, a percentage, etc.) of being able to identify the individual data of the dataset.

The linking component 450 may identify a number of linking records between an anonymized dataset (which dataset 402 has been anonymized by the anonymized dataset component 440) and one or more non-anonymized datasets of the knowledge base 480 according to one or more equivalence classes and a generalization level.

The equivalence classes component 460 may identify and extract the one or more equivalence classes of the anonymized dataset to identify the generalization level of the anonymized dataset. The equivalence classes component 460 may use a clustering operation to cluster the one or more equivalence classes using a clustering operation.

The generalization level component 470 may identify and/or extract the generalization level from the one or more equivalence classes of the anonymized dataset. The generalization level component 470 may apply the generalization level to the knowledge base 480 (e.g., a database having non-anonymized datasets) to link the one or more equivalence classes to the one or more non-non-anonymized dataset.

The linking component 450 may link data of the one or more equivalence classes of the anonymized dataset (e.g., anonymized dataset that is anonymized by the anonymized dataset component 440) to data in the knowledge base 480 according to the generalization level applied to the knowledge base 480 by the generalization level component 470. That is, the output may be linked records 404 identified between the anonymized dataset and one or more non-anonymized datasets of the knowledge base 480 according to one or more equivalence classes and a generalization level. The linking component 450 may also link risks between the data of the one or more equivalence classes of the anonymized dataset and the data in the knowledge base 480 according to the generalization level.

As one of ordinary skill in the art will appreciate, the linking records service 410 may implement mathematical modeling, probability and statistical analysis or modeling, machine reasoning, probabilistic logic, text data compression, or other data processing technologies to carry out the various mechanisms of the illustrated embodiments. In one aspect, calculations may be performed using various mathematical operations or functions that may involve one or more mathematical operations (e.g., using addition, subtraction, division, multiplication, standard deviations, means, averages, percentages, statistical modeling using statistical distributions, by finding minimums, maximums or similar thresholds for combined variables, etc.).

Figure 5:
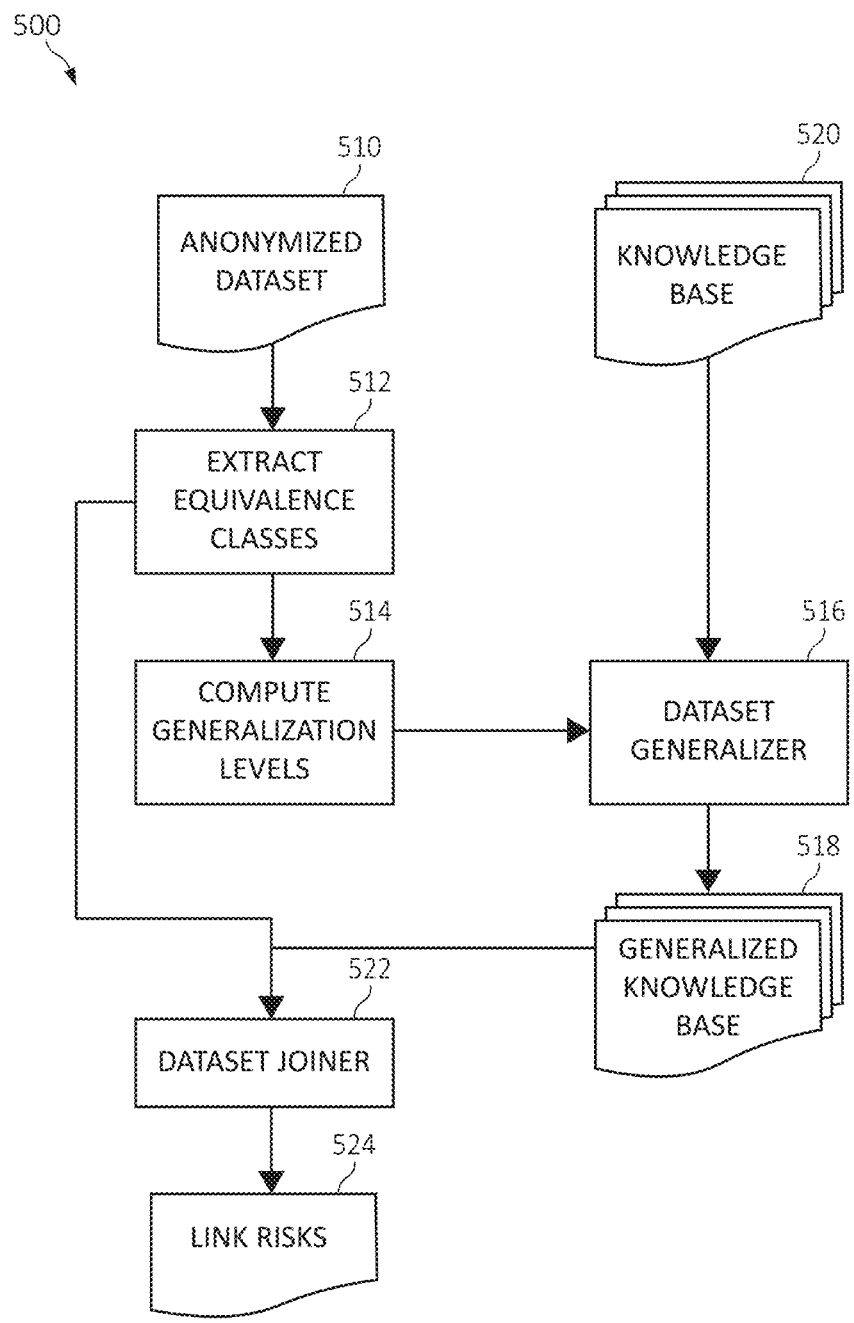
FIG. 5 is a flowchart diagram depicting an additional exemplary method for linking records between anonymized datasets and non-anonymized datasets in a computing environment in a computing environment in which aspects of the present invention may be realized.

In view of the foregoing, consider the following operation example illustrated in FIG. 5 of the implementation of the aforementioned functionality. Turning now to FIG. 5, a method 500 for fast linking of anonymized datasets in a computing environment is depicted, in which various aspects of the illustrated embodiments may be implemented. Also, one or more components, functionalities, and/or features of FIGS. 1-4 may be implemented in FIG. 5. The functionality 500 may be implemented as a method executed as instructions on a machine, where the instructions are included on at least one computer readable storage medium or one non-transitory machine-readable storage medium.

An anonymized dataset 510 may be used to extract one or more equivalence classes, as in block 512. One or more generalization levels may be determined/computed, as in block 514. That is, generalization levels may be identified by leveraging external information including, but not limited to, data hierarchies, bucketing strategies, and generalization strategies. The external information may be leveraged to generalize the knowledge base 520 according to a generalization level. A clustering algorithm may be performed to cluster the equivalence classes using a distance metric set to equality.

A dataset generalizer may apply the generalization level to a non-anonymized dataset of the knowledge base 520 to link the one or more equivalence classes to the one or more non-non-anonymized dataset, as in block 516. In one aspect, the knowledge base 520 may include public and/or private datasets related to a target data such as, for example, population/census data, voter lists, client lists, etc.

A generalized knowledge base may be used that includes the generalization level that is applied to the non-anonymized dataset of the knowledge base 520 for linking one or more equivalence classes to the one or more non-anonymized dataset, as in block 518.

A dataset joiner operation ("dataset joiner") may be performed to link one or more records between an anonymized dataset and one or more non-anonymized datasets of a knowledge base according to one or more equivalence classes and a generalization level, as in block 522. One or more risks may be linked, as in block 524. The linked risks (of block 524) may be reported as an aggregated value of the results of the join operation (of block 522) applied to all the generalization levels discovered in the anonymized dataset.

Figure 6A:
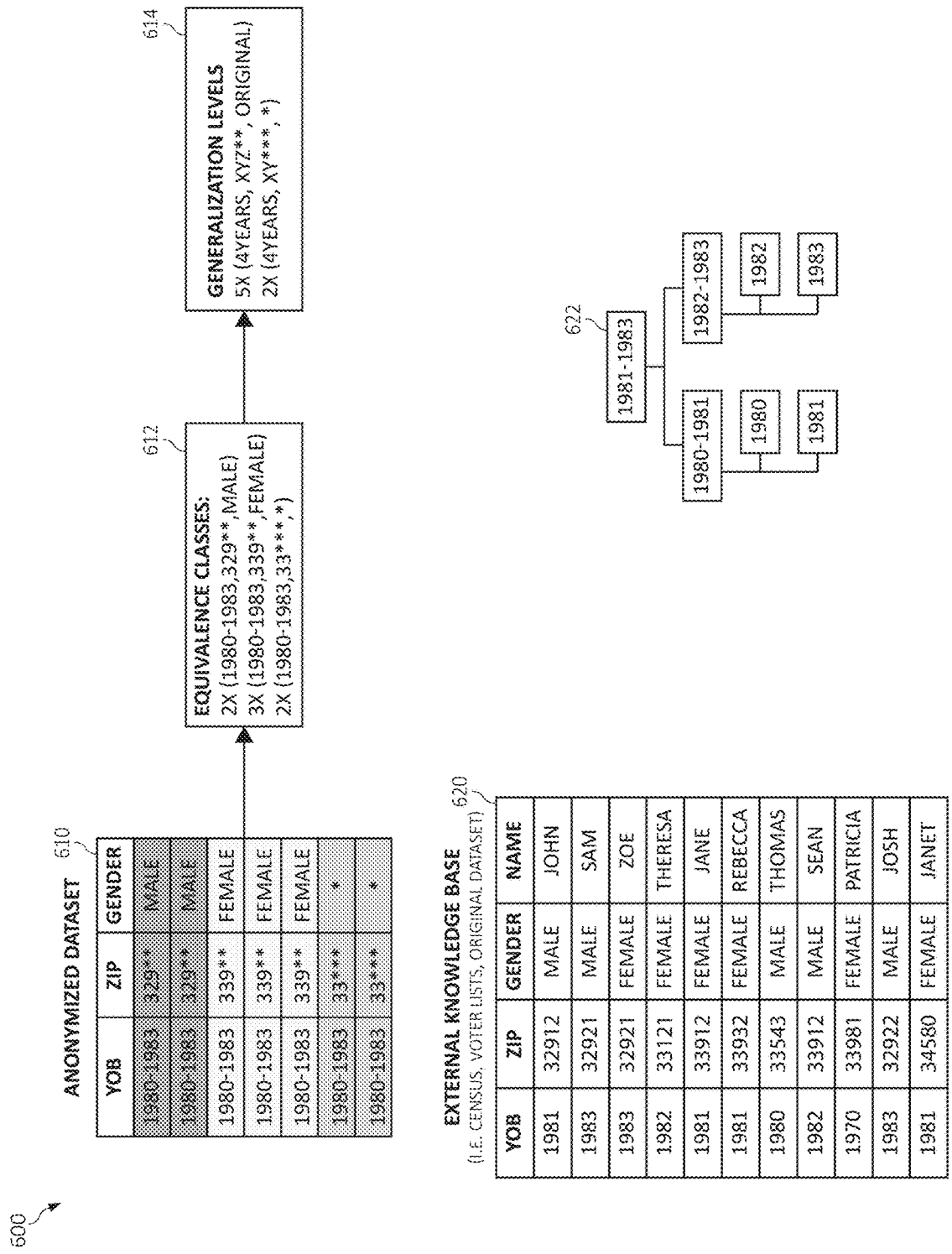
FIGS. 6A-6C are diagrams depicting exemplary operations for linking records between anonymized datasets and non-anonymized datasets in a computing environment in accordance with aspects of the present invention.
Figure 6B:
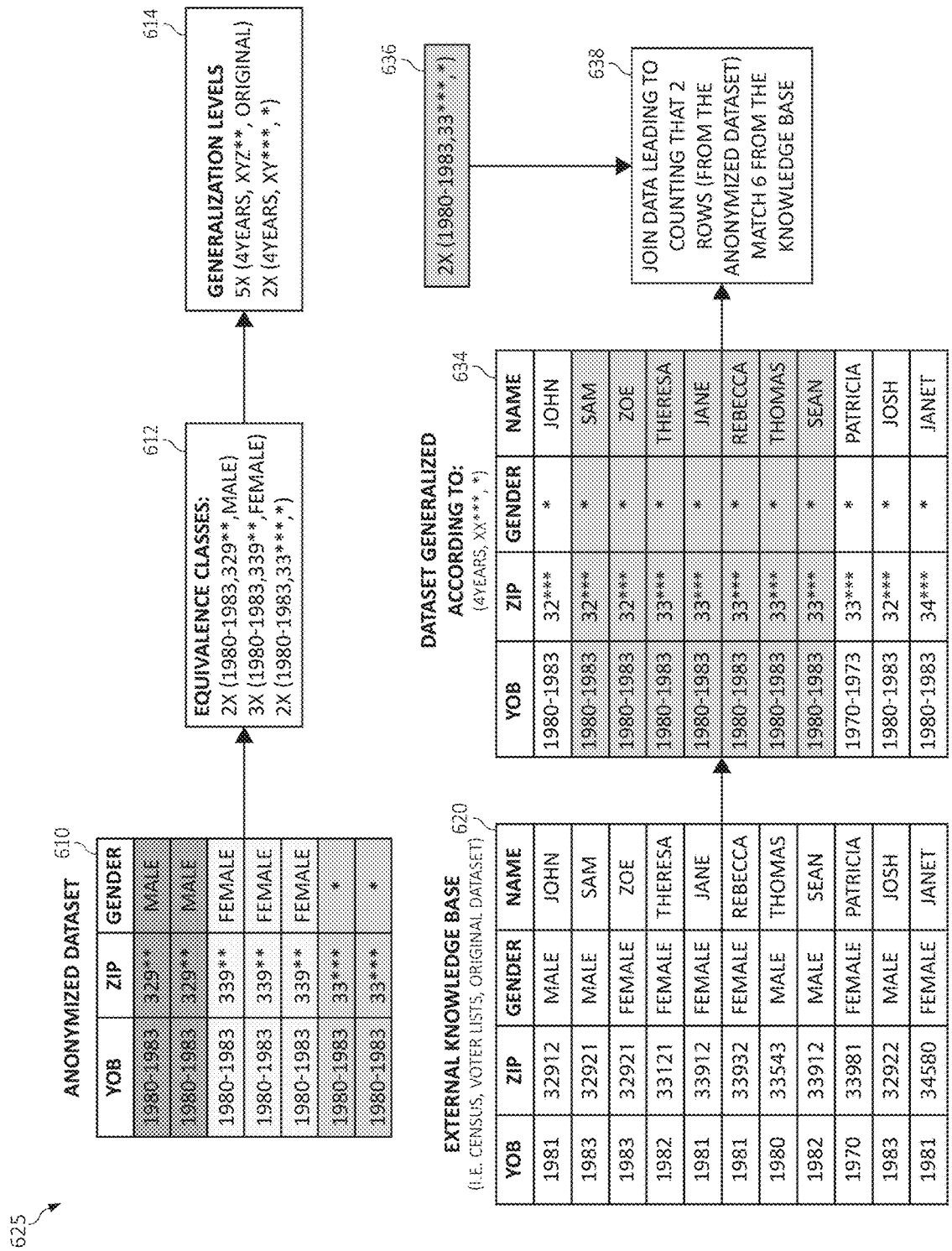

Turning now to FIGS. 6A-6B, diagrams 600, 625, and 635 depict exemplary operations for fast linking records between anonymized datasets and non-anonymized datasets is provided.

Turning now to FIG. 6A, assume now that table 610 includes anonymized data set such as, for example, a selected population, a group of male and female persons being born ("year of birth" or "YOB") between 1980 and 1983 and live in zip code 329, 339, and/or 33. That is, in a previous operation, a data anonymization operation has been performed on an original dataset to produce the anonymized dataset of table 610**. For example, a data anonymization operation (e.g., masking) may be performed on the YOB, zip code, and/or gender to randomize the name or surname and k-anonymity may be applied with k equal to two (e.g., k=2) on the gender, age, zip code combinations. In one aspect, the "*" depicted in FIGS. 6A-6C (described below) may be a selected, defined, or a masked numerical value.

An equivalence classes operation may be performed on anonymized data, which is depicted in table 612. The identified and extracted equivalence classes show 2× (1980-1983,329, Male), 3× (1980-1983,339, Female), and 2× (1980-1983,33***, *). The equivalence classes can be extracted using one or more clustering operation operating on the fields involved in the anonymization process (i.e., quasi and direct identifiers) of table 610.

An external knowledge base may include non-anonymized data as illustrated in table 612. For example, the external knowledge base of table 612 may include YOB, zip code, gender, and a person's name.

The generalization levels depict 5× (4 years, XYZ, Original) and 2× (4 years, XY*, *). The generalization levels extracted from the values of the equivalence classes, either by analyzing the data or as ancillary information from the anonymization operation (e.g., performed via the anonymized dataset component 440 of FIG. 4) used to anonymize the dataset. The generalization level can be inferred from the data such as, for example, observing that the ZIP code shows only 3 of the 5 expected digits, or using information external such as, for example, the hierarchy used in the data anonymization process, if available. It should be noted that the distinct equivalence classes can have the same generalization level. The generalization levels may refer to transformation on the data or levels in type hierarchies as illustrated in hierarchy 622 (e.g., a hierarchy of YOB).

As illustrated in FIG. 6B, a generalization level may be applied to the external knowledge base of table 620. That is, the generalization level applied to the external knowledge base of table 620 may yield a dataset of table 634 generalized according to the selected generalization level from the generalization levels 614 (e.g., 4 years, XX**, *). An equivalence class 636 from the equivalence class 612 may be joined using one or more joining operation with data leading to counting that 2 rows (e.g., 2 rows from the anonymized dataset of table 610) match 6 rows from the knowledge base of table 634, as in block 638.

Figure 6C:
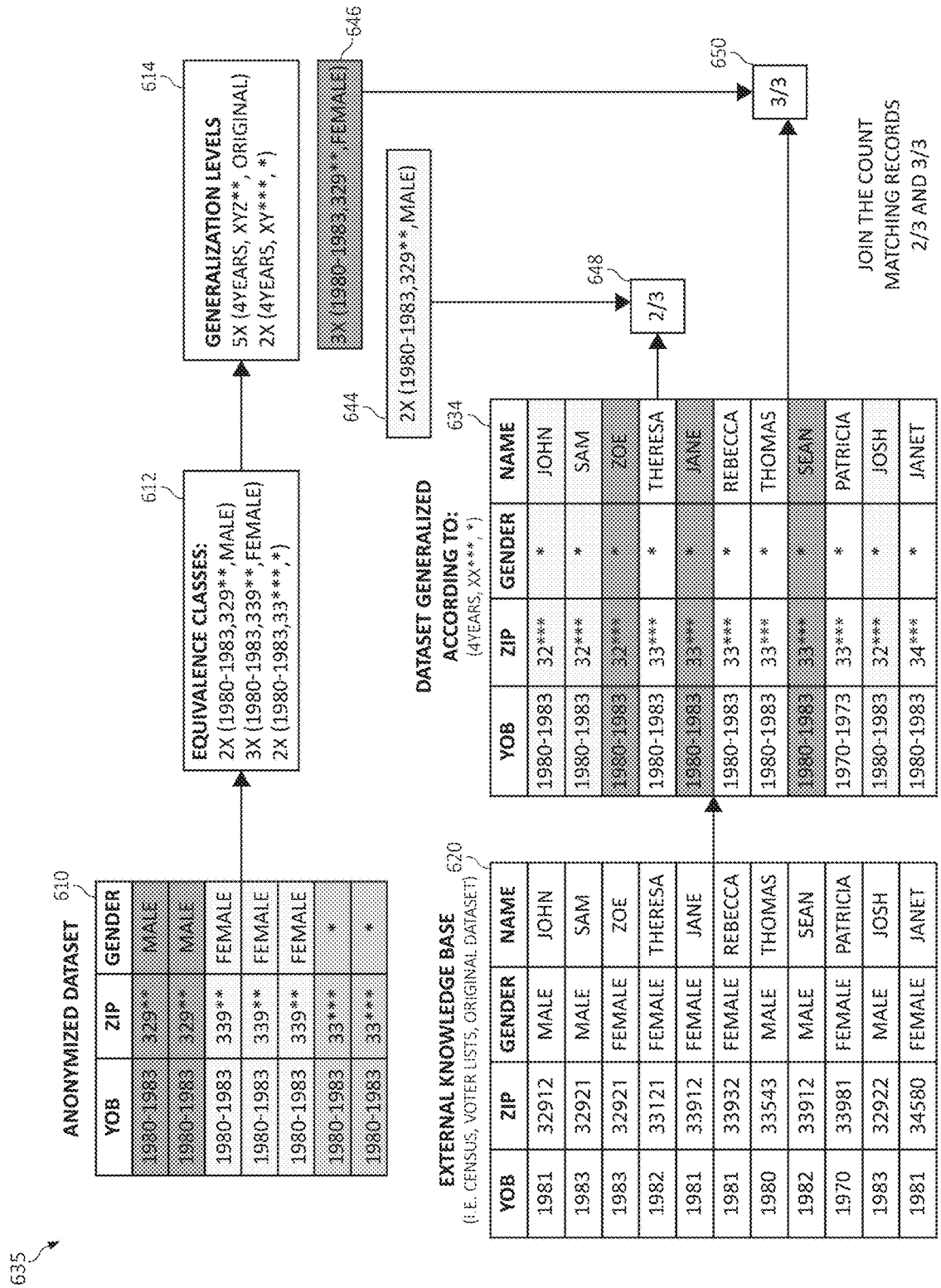

Additionally, as illustrated in FIG. 6C, the equivalence class 644 from the equivalence class 612 may be joined using one or more joining operation with data leading to counting that 2 rows (e.g., 2 rows from the anonymized dataset of table 610) match 3 rows from the knowledge base of table 634, as in block 648. The equivalence class 646 from the equivalence class 612 may be joined using one or more joining operation with data leading to counting that 3 rows (e.g., 3 rows from the anonymized dataset of table 610) match 3 rows from the knowledge base of table 634, as in block 650.

In this way, the present invention achieves high scalability as it requires orders of magnitudes of less queries of the current state of the art. For example, currently, systems need to perform as many queries as the number of equivalence classes, which is in the order of thousands or tens of thousands. Without the mechanisms of the illustrated embodiment, the number of queries is bound to the maximum number of generalization level combinations, which is usually in the order of tens or few hundreds. Thus, the present invention uniformly handles cases where a local or global recoding anonymization approach is applied. For use of global recoding, the same generalization level may be applied to all the records of the dataset, while local recoding allows different generalization levels for different sets of records. The present invention does not require any changes at the underlying database system or querying system and supports hierarchical queries, without requiring additional functionality. The present invention uniformly handles the situation/cases where linking attributes (e.g., the operands of a join operation) are different from the anonymized attributes.

Figure 7:
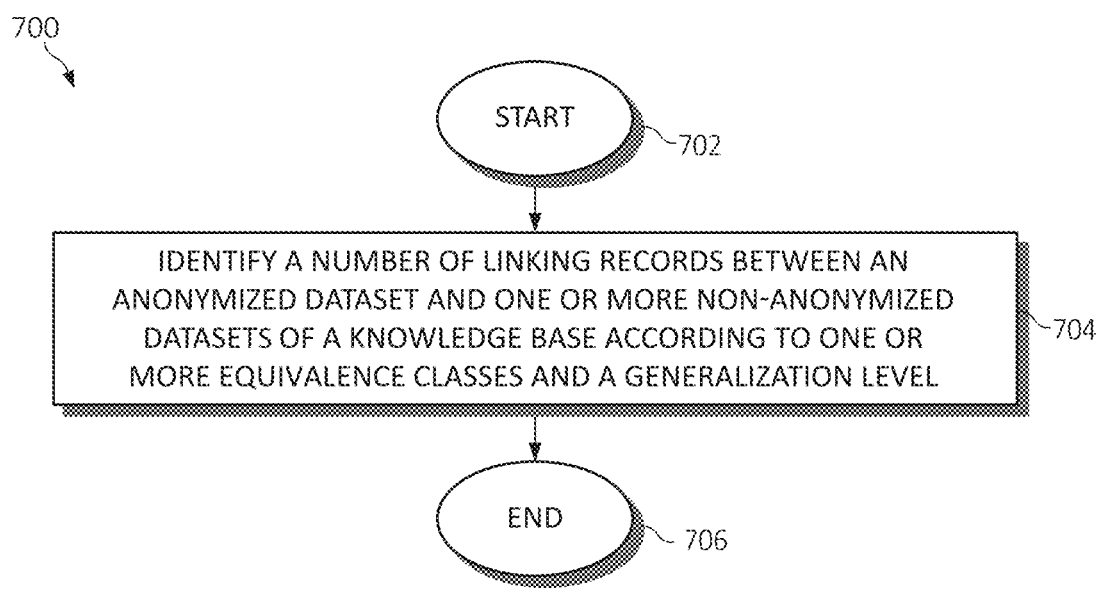
FIG. 7 is a flowchart diagram depicting an exemplary method for linking records between anonymized datasets and non-anonymized datasets in a computing environment in a computing environment in which aspects of the present invention may be realized.

Turning now to FIG. 7, a method 700 for linking of anonymized datasets in a computing environment is depicted, in which various aspects of the illustrated embodiments may be implemented. The functionality 700 may be implemented as a method executed as instructions on a machine, where the instructions are included on at least one computer readable storage medium or one non-transitory machine-readable storage medium. The functionality 700 may start in block 702.

A number of linking records may be identified between an anonymized dataset and one or more non-anonymized datasets of a knowledge base according to one or more equivalence classes and a generalization level, as in block 704. The functionality 700 may end in block 706.

Figure 8:
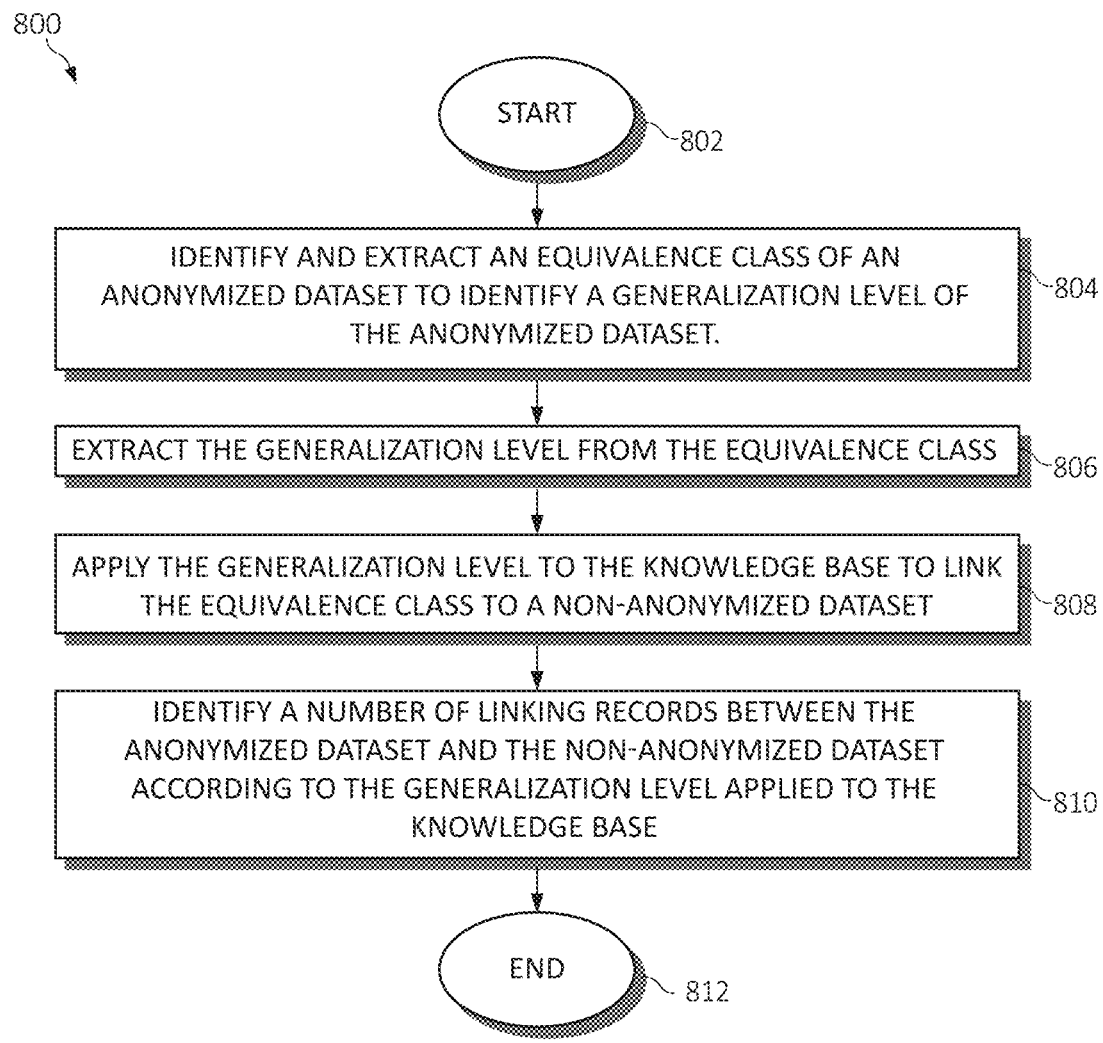
FIG. 8 is a flowchart diagram depicting an exemplary method for linking records between anonymized datasets and non-anonymized datasets in a computing environment in a computing environment in which aspects of the present invention may be realized.

Turning now to FIG. 8, a method 800 for linking of anonymized datasets in a computing environment is depicted, in which various aspects of the illustrated embodiments may be implemented. The functionality 800 may be implemented as a method executed as instructions on a machine, where the instructions are included on at least one computer readable storage medium or one non-transitory machine-readable storage medium. The functionality 800 may start in block 802.

An equivalence class of an anonymized dataset may be identified and extracted to identify a generalization level of the anonymized dataset, as in block 804. The generalization level (that is identified) may be extracted from the equivalence class, as in block 806. The generalization level may be applied to the knowledge base to link the equivalence class to a non-anonymized dataset, as in block 808. A number of linking records may be identified between the anonymized dataset and the non-anonymized dataset according to the generalization level applied to the knowledge base, as in block 810. The functionality 800 may end in block 812.

In one aspect, in conjunction with and/or as part of at least one block of FIGS. 7-8, the operations of 700 and/or 800 may include one or more of each of the following. The operations of 700 and/or 800 may cluster one or more equivalence classes using a clustering operation. One or more risks may be linked between the data of the one or more equivalence classes of the anonymized dataset and the data in the knowledge base according to the generalization level.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for linking of anonymized datasets in a computing environment, comprising:
    identifying a number of linking records between an anonymized dataset and one or more non-anonymized datasets of a knowledge base according to one or more equivalence classes and a generalization level; and
    applying the generalization level to the knowledge base to link the one or more equivalence classes to the one or more non-anonymized datasets.

2. The method of claim 1, further including identifying and extracting the one or more equivalence classes of the anonymized dataset to identify the generalization level of the anonymized dataset.

3. The method of claim 1, further including clustering the one or more equivalence classes using a clustering operation.

4. The method of claim 1, further including extracting the generalization level from the one or more equivalence classes of the anonymized dataset.

5. The method of claim 1, further including linking data of the one or more equivalence classes of the anonymized dataset to data in the knowledge base according to the generalization level applied to the knowledge base.

6. The method of claim 5, further including linking risks between the data of the one or more equivalence classes of the anonymized dataset and the data in the knowledge base according to the generalization level.

7. A system for linking of anonymized datasets in a computing environment, comprising:
    one or more computers with executable instructions that when executed cause the system to:
        identify a number of linking records between an anonymized dataset and one or more non-anonymized datasets of a knowledge base according to one or more equivalence classes and a generalization level; and
        apply the generalization level to the knowledge base to link the one or more equivalence classes to the one or more non-anonymized datasets.

8. The system of claim 7, wherein the executable instructions identify and extract the one or more equivalence classes of the anonymized dataset to identify the generalization level of the anonymized dataset.

9. The system of claim 7, wherein the executable instructions cluster the one or more equivalence classes using a clustering operation.

10. The system of claim 7, wherein the executable instructions extract the generalization level from the one or more equivalence classes of the anonymized dataset.

11. The system of claim 7, wherein the executable instructions link data of the one or more equivalence classes of the anonymized dataset to data in the knowledge base according to the generalization level applied to the knowledge base.

12. The system of claim 7, wherein the executable instructions link risks between the data of the one or more equivalence classes of the anonymized dataset and the data in the knowledge base according to the generalization level.

13. A computer program product for, by a processor, linking of anonymized datasets in a computing environment, the computer program product comprising a non-transitory computer-readable storage medium having computer-readable program code portions stored therein, the computer-readable program code portions comprising:
    an executable portion that identifies a number of linking records between an anonymized dataset and one or more non-anonymized datasets of a knowledge base according to one or more equivalence classes and a generalization level; and an executable portion that applies the generalization level to the knowledge base to link the one or more equivalence classes to the one or more non-anonymized datasets.

14. The computer program product of claim 13, further including an executable portion that identifies and extracts the one or more equivalence classes of the anonymized dataset to identify the generalization level of the anonymized dataset.

15. The computer program product of claim 13, further including an executable portion that clusters the one or more equivalence classes using a clustering operation.

16. The computer program product of claim 13, further including an executable portion that extracts the generalization level from the one or more equivalence classes of the anonymized dataset.

17. The computer program product of claim 13, further including an executable portion that:
   links data of the one or more equivalence classes of the anonymized dataset to data in the knowledge base according to the generalization level applied to the knowledge base; and
   links risks between the data of the one or more equivalence classes of the anonymized dataset and the data in the knowledge base according to the generalization level.

* * * * *